US012768814B2

(12) United States Patent
Schmidt et al.

(10) Patent No.: US 12,768,814 B2
(45) Date of Patent: Oct. 20, 2026

(54) COMBINED MAGNETIC FORCE DILATOMETRY WITH X-RAY DIFFRACTION

(71) Applicant: GM Global Technology Operations LLC, Detroit, MI (US)

(72) Inventors: Robert D. Schmidt, Bloomfield Hills, MI (US); Nicholas Paul William Pieczonka, Troy, MI (US); Ratandeep Singh Kukreja, Auburn Hills, MI (US); Devendrasinh Darbar, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 164 days.

(21) Appl. No.: 18/922,982

(22) Filed: Oct. 22, 2024

(65) Prior Publication Data

US 2026/0110662 A1 Apr. 23, 2026

(51) Int. Cl.
*G01N 27/72* (2006.01)
*G01N 21/55* (2014.01)
*G01N 23/20* (2018.01)

(52) U.S. Cl.
CPC ............. *G01N 27/72* (2013.01); *G01N 21/55* (2013.01); *G01N 23/20* (2013.01)

(58) Field of Classification Search
CPC .. G01R 31/382; G01R 31/392; G01R 31/389; G01R 31/367; G01R 31/378; G01R 13/00; G01R 27/02; G01R 31/3828; G01R 31/388; G06T 3/4038; G06T 19/00; Y02W 30/84; G06V 40/1318; Y02E 60/10; Y02E 60/50; Y02E 60/13; Y02E 10/50; Y02T 10/70; Y02T 10/7072; G01B 15/06; G01L 1/12; G01N 21/55; G01N 23/20; G01N 27/72; H01M 10/44; H01M 10/48
See application file for complete search history.

(56) References Cited

U.S. PATENT DOCUMENTS

| | | | | |
|---|---|---|---|---|
| 9,917,335 | B2 * | 3/2018 | Jarvis | H01M 10/4257 |
| 12,494,520 | B2 * | 12/2025 | Schmidt | H01M 10/48 |
| 12,553,701 | B2 * | 2/2026 | Balogh | G01B 7/24 |

* cited by examiner

*Primary Examiner* — Vinh P Nguyen
(74) *Attorney, Agent, or Firm* — Honigman LLP; Matthew H. Szalach

(57) ABSTRACT

A method includes determining a total expansion value for a coin cell based on processing of first sensor data captured by a magnetic force dilatometry sensor. The first sensor data is representative of the coin cell during a cycling program of the coin cell with the coin cell held at a fixture. Based on processing of second sensor data captured by an imaging sensor, the method includes determining a reversible expansion value for the coin cell. The second sensor data is representative of the coin cell during the cycling program of the coin cell with the coin cell held at the fixture. Based on the total expansion value and the reversible expansion value, the method includes determining an irreversible expansion value for the coin cell.

20 Claims, 8 Drawing Sheets

COMBINED MAGNETIC FORCE DILATOMETRY WITH X-RAY DIFFRACTION

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to systems and methods for detecting and analyzing properties of rechargeable battery cells during cycling of the battery. Over the life of a rechargeable battery, such as a lithium ion battery for a vehicle, charging and discharging of the battery causes battery cells to expand and retract, with the cells experiencing an overall expansion over time. A portion of cell expansion is reversible, such as the portion of cell expansion caused by electrode lattice expansion during the transfer of ions between electrodes, while other causes of cell expansion are irreversible, such as the portion of cell expansion caused by the creation of solid electrolyte interphase (SEI) and other byproducts at the electrodes. Irreversible expansion of the electrodes often results in irreversible loss of electrode capacity and, thus, reduced performance of the battery.

Typically, determining cell swelling due to creation of SEI or other byproducts separate from normal operating expansion and contraction is difficult to do and requires a combined analysis of the results from multiple separate experiments. This reduces the effectiveness and efficiency of quality control and validation efforts for existing batteries and reduces the ability to investigate new materials and constructions for battery cells.

SUMMARY

One aspect of the disclosure provides a computer-implemented method that, when executed on data processing hardware, causes the data processing hardware to perform operations. The operations include determining a total expansion value for a coin cell based on processing of first sensor data captured by a magnetic force dilatometry sensor. The first sensor data is representative of the coin cell during a cycling program of the coin cell with the coin cell held at a fixture. Based on processing of second sensor data captured by an imaging sensor, the operations include determining a reversible expansion value for the coin cell. The second sensor data is representative of the coin cell during the cycling program of the coin cell with the coin cell held at the fixture. Based on the total expansion value and the reversible expansion value, the operations include determining an irreversible expansion value for the coin cell.

Implementations of the disclosure may include one or more of the following optional features. In some implementations, the irreversible expansion value is at least in part representative of a buildup of solid electrolyte interphase (SEI) at the coin cell. In some examples, the reversible expansion value is at least in part representative of a lattice expansion of an electrode of the coin cell.

In some aspects, the imaging sensor includes an X-Ray detector configured to sense X-Rays reflected from the coin cell. In further aspects, the coin cell includes a window at a side of the coin cell facing the X-Ray detector. The window is at least partially transparent to X-Rays.

In some implementations, the imaging sensor includes an optical microscope configured to view visible light reflected from the coin cell. In further implementations, the coin cell includes a window at a side of the coin cell facing the optical microscope. The window is at least partially transparent to visible light.

In some examples, with the coin cell held at the fixture, a first side of the coin cell faces the magnetic force dilatometry sensor and a second side of the coin cell opposite the first side faces the imaging sensor. In further examples, a cathode of the coin cell is nearest the second side of the coin cell. In some aspects, the coin cell is representative of a rechargeable battery of a vehicle.

Another aspect of the disclosure provides a system. The system includes a fixture configured to hold a coin cell during a cycling program of the coin cell. A magnetic force dilatometry sensor is disposed at or near the fixture. An imaging sensor is disposed at or near the fixture. The system includes memory hardware storing instructions that, when executed on data processing hardware in communication with the memory hardware, cause the data processing hardware to perform operations. The operations include determining a total expansion value for the coin cell based on processing of first sensor data captured by the magnetic force dilatometry sensor. The first sensor data is representative of the coin cell during the cycling program of the coin cell. Based on processing of second sensor data captured by the imaging sensor, the operations include determining a reversible expansion value for the coin cell. The second sensor data is representative of the coin cell during the cycling program of the coin cell. Based on the total expansion value and the reversible expansion value, the operations include determining an irreversible expansion value for the coin cell. This aspect may include one or more of the following optional features.

In some implementations, the irreversible expansion value is at least in part representative of a buildup of solid electrolyte interphase (SEI) at the coin cell. In some examples, the reversible expansion value is at least in part representative of a lattice expansion of an electrode of the coin cell.

In some aspects, the imaging sensor includes an X-Ray detector configured to sense X-Rays reflected from the coin cell. In further aspects, the coin cell includes a window at a side of the coin cell facing the X-Ray detector. The window is at least partially transparent to X-Rays.

In some implementations, the imaging sensor includes an optical microscope configured to view visible light reflected from the coin cell. In further implementations, the coin cell includes a window at a side of the coin cell facing the optical microscope. The window is at least partially transparent to visible light.

In some examples, with the coin cell held at the fixture, a first side of the coin cell faces the magnetic force dilatometry sensor and a second side of the coin cell opposite the first side faces the imaging sensor. In further examples, a cathode of the coin cell is nearest the second side of the coin cell. In some aspects, the coin cell is representative of a rechargeable battery of a vehicle.

The details of one or more implementations of the disclosure are set forth in the accompanying drawings and the description below. Other aspects, features, and advantages will be apparent from the description and drawings, and from the claims.

BRIEF DESCRIPTION OF THE DRAWINGS

The drawings described herein are for illustrative purposes only of selected configurations and are not intended to limit the scope of the present disclosure.

Corresponding reference numerals indicate corresponding parts throughout the drawings.

DETAILED DESCRIPTION

Figure 1:
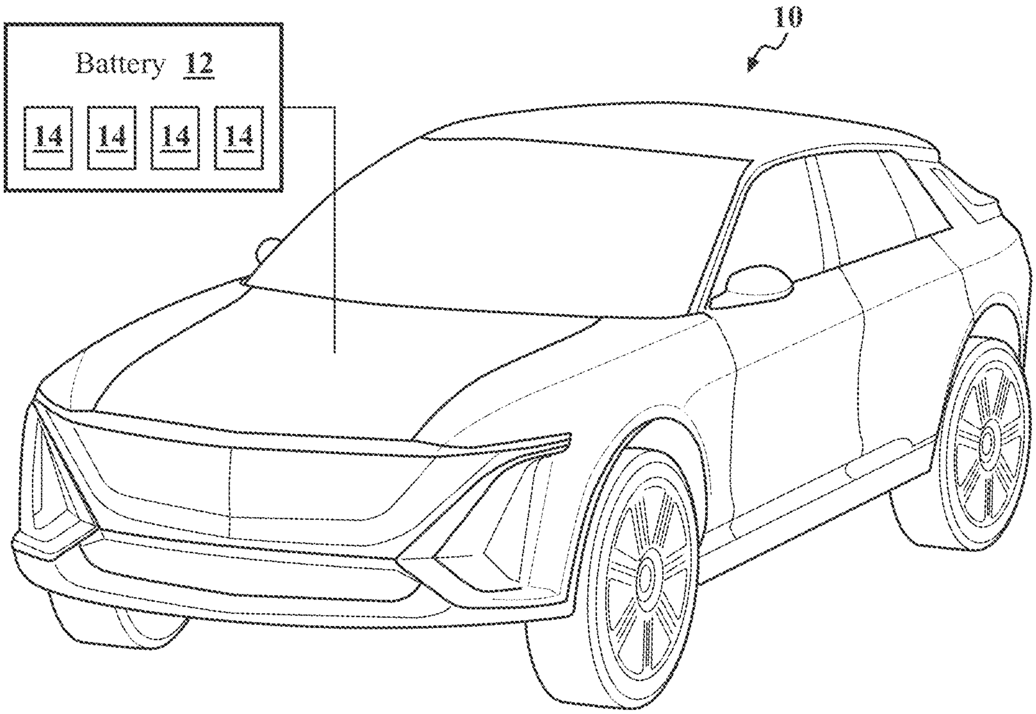
FIG. 1 is a perspective view of a vehicle having a rechargeable battery configured to power a propulsion system of the vehicle.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms "first," "second," "third," etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below, the term "module" may be replaced with the term "circuit." The term "module" may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term "code," as used above, may include software, firmware, and/or microcode, and may refer to programs, routines, functions, classes, and/or objects. The term "shared processor" encompasses a single processor that executes some or all code from multiple modules. The term "group processor" encompasses a processor that, in combination with additional processors, executes some or all code from one or more modules. The term "shared memory" encompasses a single memory that stores some or all code from multiple modules. The term "group memory" encompasses a memory that, in combination with additional memories, stores some or all code from one or more modules. The term "memory" may be a subset of the term "computer-readable medium." The term "computer-readable medium" does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Referring now to the figures and the illustrated configurations depicted therein, a vehicle 10, such as an electric vehicle (EV) or a plug-in hybrid vehicle (PHEV) or a hybrid vehicle, includes a rechargeable battery assembly 12 that at least partially powers a propulsion system of the vehicle 10 (FIG. 1). For example, the battery assembly 12 may include a lithium ion battery assembly, a nickel metal hydride battery assembly, a lithium metal battery assembly, a sodium ion battery assembly, a combination of these assemblies into a master assembly, and the like. The battery assembly 12 includes a plurality of cells 14 (each cell including electrodes, electrolyte, current collectors, and the like) that store and release electric charge. During operation of the rechargeable battery assembly 12, such as during charging of the battery 12 or during discharge of the battery 12 to power the propulsion system of the vehicle 10, individual cells 14 of the battery assembly 12 may expand and retract.

A portion of the expansion of the battery cells 14 is reversible and a portion of the expansion of the battery cells 14 is irreversible. In the example of the lithium ion battery 12, electrodes of the cells 14 expand as lithium ions transfer into the electrode and retract as lithium ions transfer out of the electrode. That is, the lattice structure of the electrode expands and retracts during operation of the battery assembly 12. This expansion is reversible. Further, solid electrolyte interphase (SEI) and other byproducts are generated within the electrodes of the cells 14 during operation of the battery assembly 12 and cause irreversible expansion of the cell 14. Because the irreversible portion of the expansion of the battery cells 14 generally results in irreversible loss of battery capacity, a measurement of the irreversible expansion is a valuable measurement in determining battery viability.

Further, because coin cells are relatively easy and quick to manufacture using limited resources, and because coin cells may exhibit similar characteristics to large-scale and high-power applications when electrically cycled, coin cells may be used in testing environments to investigate new battery materials and configurations, such as to determine battery capacities and rate capabilities. To determine, among other characteristics, a ratio of reversible cell expansion to irreversible cell expansion, coin cells 114 representative of the cells 14 of the battery 12 are tested during early development stages and quality control processes of the battery 12.

Figure 2:
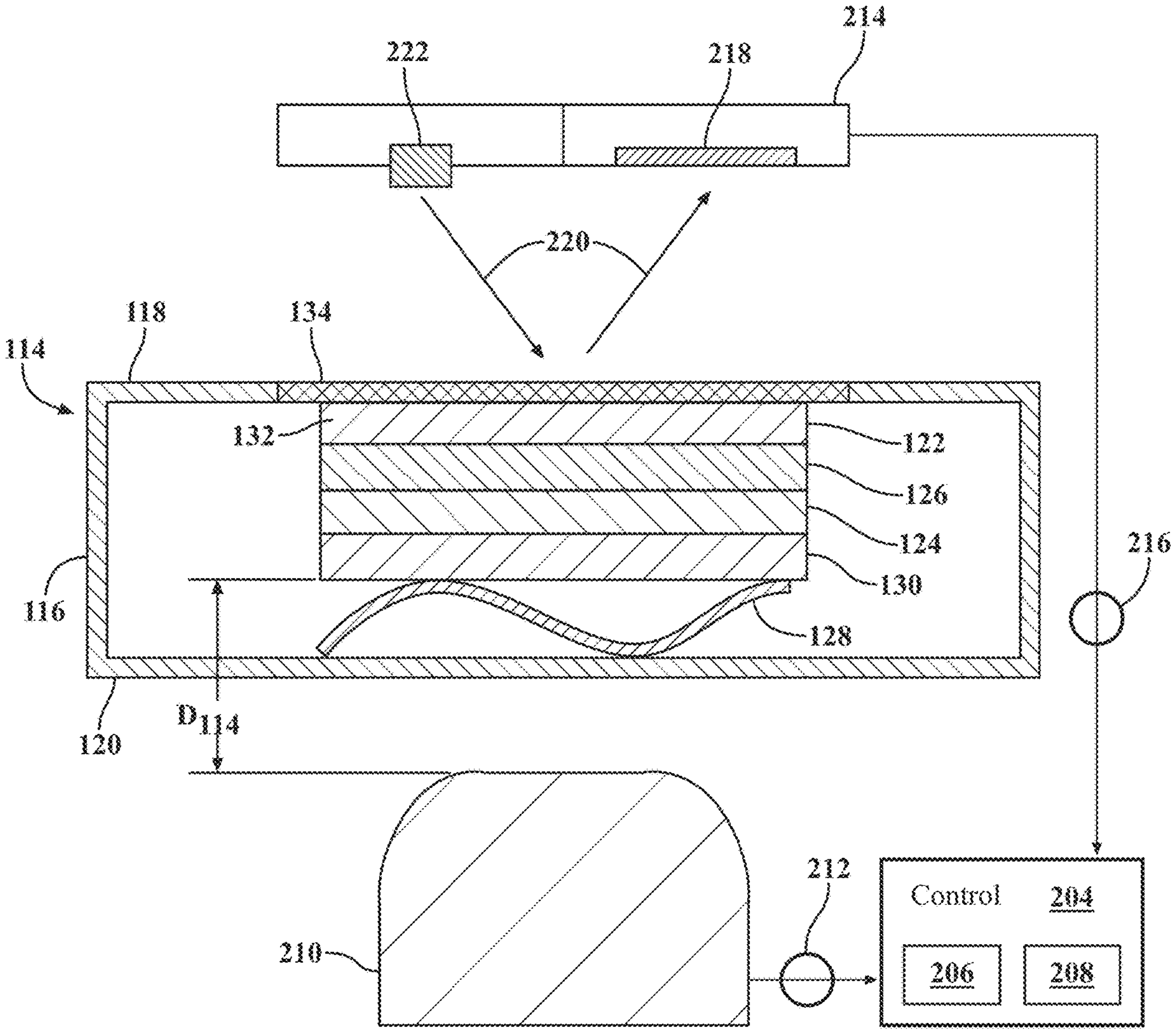
FIG. 2 is a sectional view of a testing system including a magnetic force dilatometry sensor and an imaging sensor for monitoring a coin cell during a cycling program of the coin cell.
Figure 3:
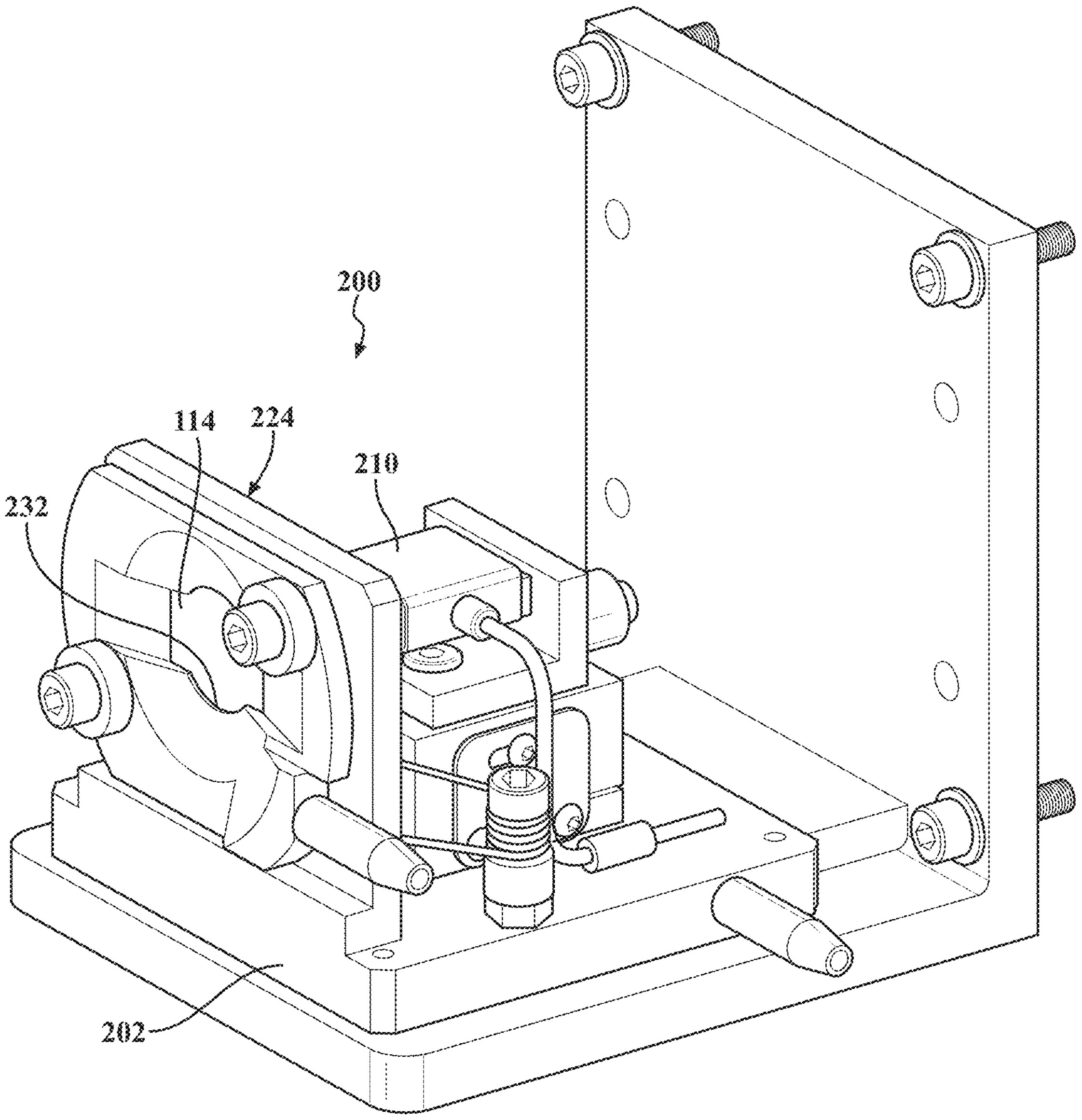
FIGS. 3 and 4 are perspective views of the testing system.
Figure 4:
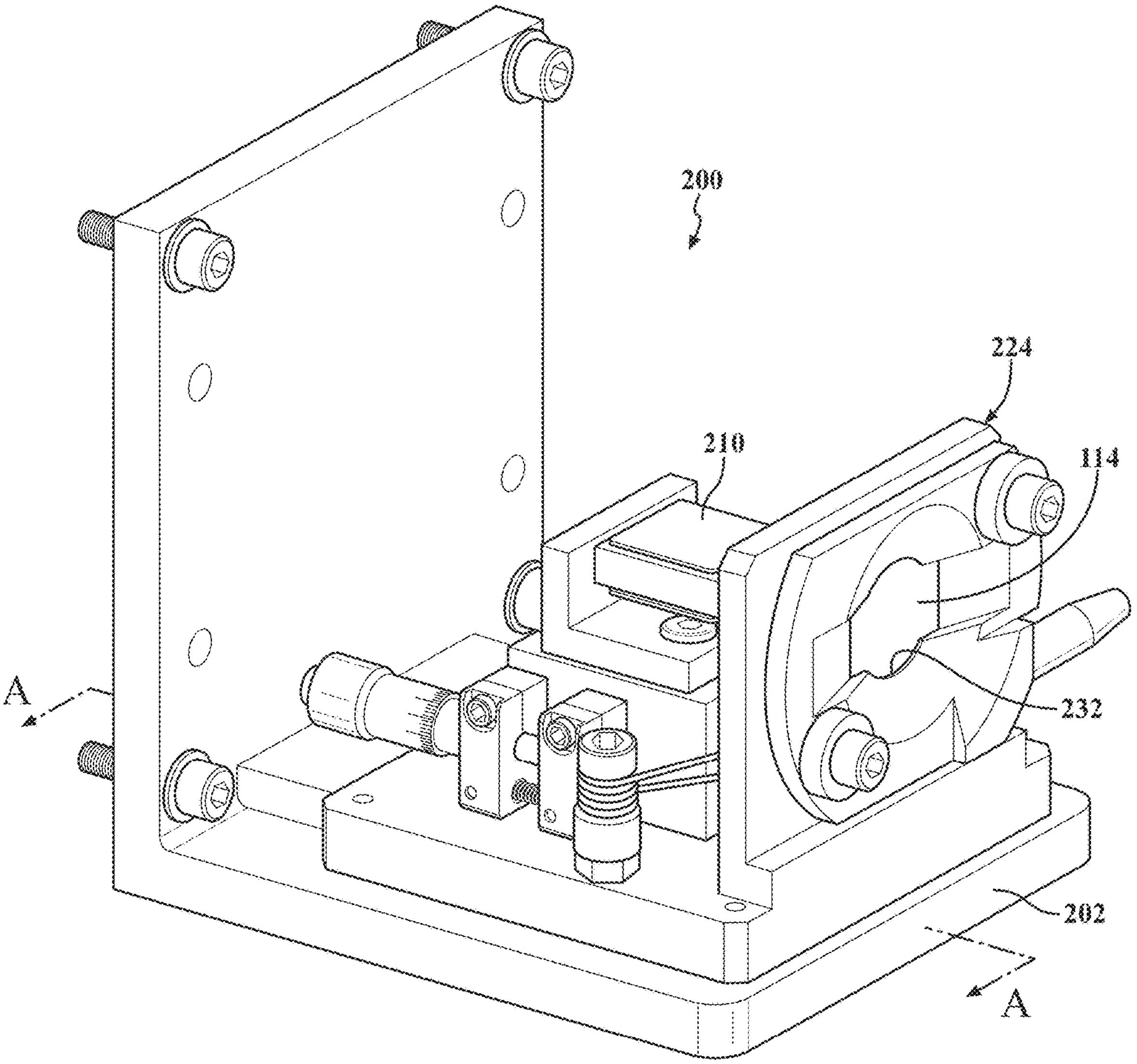
Figure 4A:
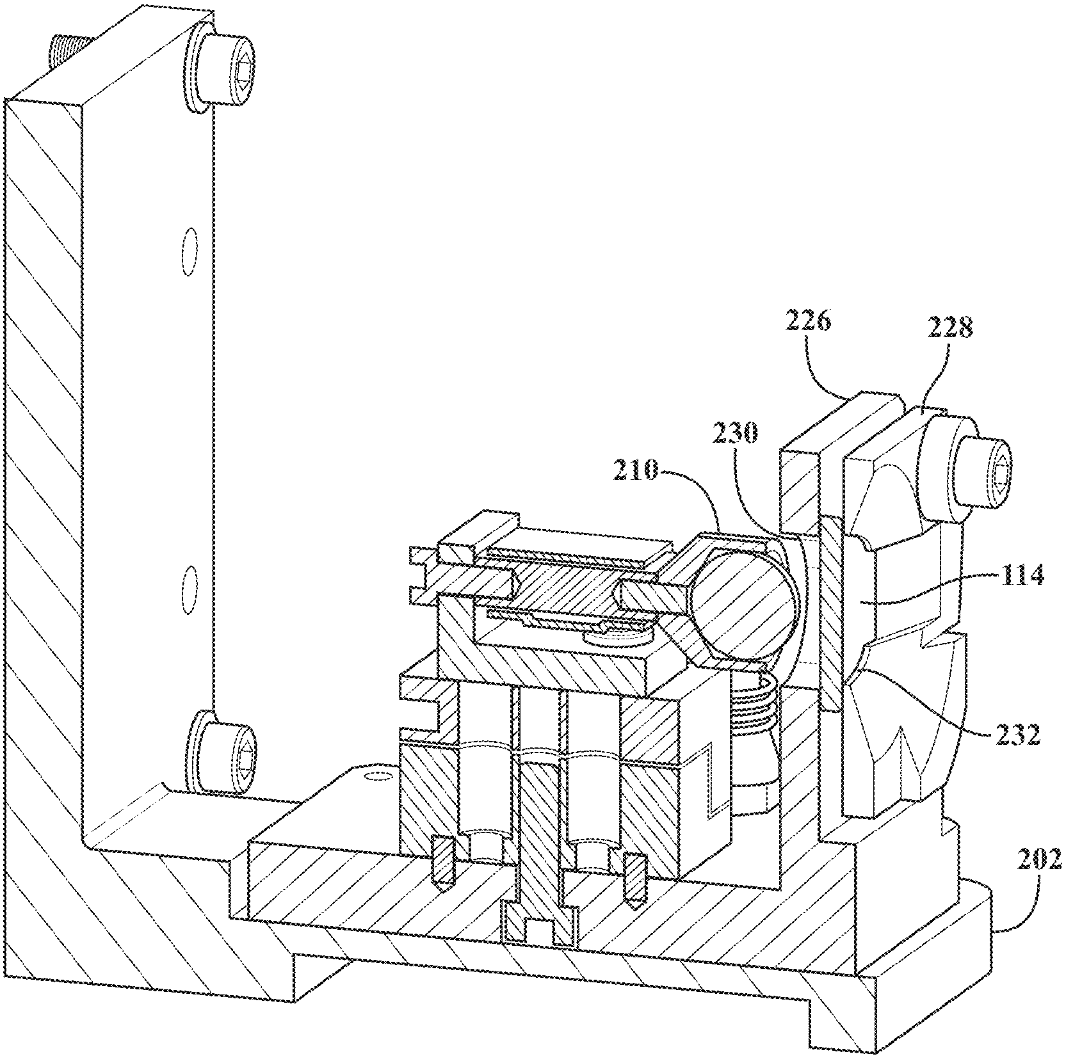
FIG. 4A is a sectional view of the testing system taken along the line A-A of FIG. 4.

As shown in FIG. 2, a coin cell 114 includes a case 116 having a first portion or top portion 118 and a second portion or bottom portion 120 that are joined together to accommodate the components of the coin cell 114. At an interior portion of the case 116, the coin cell 114 includes a first electrode 122 (such as a cathode), a second electrode 124 (such as an anode), a separator 126 between first electrode 122 and the second electrode 124, and a biasing element 128 (such as a wave spring) urging the electrode stack (i.e., the first electrode 122, the second electrode 124 and the separator 126) into engagement. A spacer 130, such as a ferritic stainless steel spacer, may be disposed between the biasing element 128 and the electrode stack. In the illustrated example, the first electrode 122 is disposed adjacent to or nearest to the first portion 118 of the case 116 and includes an active material (e.g., a lithium oxide). The biasing element 128 is disposed adjacent to or nearest to the second portion 120 of the case 116, with the spacer 130, the second electrode 124 and the separator 126 disposed between the first electrode 122 and the biasing element 128. It should be understood that differently configured coin cells, such as those having additional spacers or separators or those having differently configured biasing elements, may be utilized without deviating from the aspects of the disclosure.

Referring to FIGS. 2-4A, a testing system 200 for measuring characteristics of a battery cell 14 includes a test stand or fixture 202 that is configured to receive or hold a sample or specimen for testing. In the illustrated example, the sample being tested is the coin cell 114 that is representative of one or more cells 14 of the battery 12. However, it should be understood that the testing system 200 may be suitable for testing other types of battery cells, such as a pouch cell or prismatic cell. During testing, the coin cell 114 may be electrically cycled according to any desired program by applying the appropriate voltage and current and the testing system 200 captures sensor data representative of the coin cell 114 for processing and monitoring of changes in the coin cell 114.

The testing system 200 may include or be in communication with a control module 204 that includes data processing hardware 206 and memory hardware 208 in communication with the data processing hardware 206. The memory hardware 208 stores instructions that, when executed on the data processing hardware 206, cause the data processing hardware to perform operations. For example, the control module 204 stores instructions for operating the testing system 200 to determine reversible and irreversible expansion of the coin cell 114, such as according to the method 600 of FIG. 6 discussed further below.

A dilatometry sensor 210, such as a magnetic force dilatometry sensor, is disposed at or near the test stand 202 and is configured to sense expansion and contraction of the coin cell 114. That is, with the coin cell 114 disposed at the test stand 202 and during electric cycling of the coin cell 114, the magnetic force dilatometry sensor 210 captures first sensor data 212 indicative of dimensional changes within the case 116 of the coin cell 114. Because the case 116 of the coin cell 114 and the magnetic force dilatometry sensor 210 are fixed at the test stand 202 during cycling of the coin cell 114, the electrode stack (and specifically the ferritic spacer 130) expands toward the second portion 120 of the case 116 against the biasing member 128 and toward the magnetic force dilatometry sensor 210. With the biasing member 128 disposed between the magnetic force dilatometry sensor 210 and the ferritic spacer 130, the force applied on the electrode stack by the biasing member 128 may be reduced, such as by about one to two pound force (lbf) (or about ten percent of average loading) when a spacer 130 having a thickness of one millimeter is used. The reduction in force applied by the biasing member 128 may vary based on a distance between a magnet of the dilatometry sensor 210 and the coin cell 114, a force of the magnet, a size and material of the spacer 130, a spring force of the biasing member 128, and the like.

Moreover, an electromagnetic radiation-based imaging sensor 214 is disposed at or near the test stand 202 and configured to view changes in a microstructure or a lattice structure 132 of the first electrode 122 during electrical cycling of the coin cell 114. In other words, with the coin cell 114 disposed at the test stand 202 and during cycling of the coin cell 114, the imaging sensor 214 views the coin cell 114 and captures second sensor data 216. The first portion 118 of the case 116 includes a window 134 that is at least partially transparent to electromagnetic radiation so that the imaging sensor 214 may view the first electrode 122 through the window 134. For example, the imaging sensor 214 may include an X-Ray detector 218 configured to sense X-Rays 220 emitted from an X-Ray source 222 and reflected from the coin cell 114. That is, the testing system 200 may monitor changes in the lattice structure 132 of the first electrode 122 using X-Ray diffraction techniques. In other examples, the testing system may include an optical microscope or microscope camera that views visible light reflected from the coin cell 114, or the testing system may monitor the first electrode 122 using Raman spectroscopy techniques, ultraviolet-visible spectroscopy techniques, X-Ray fluorescence techniques, and the like.

Accordingly, with the second side or portion 120 of the case 116 facing the magnetic force dilatometry sensor 210, the opposite first side or portion 118 of the case 116 (having the first electrode 122 disposed against or near the first portion 118) faces away from the dilatometry sensor 210 and toward the imaging sensor 214. In the illustrated example of FIGS. 3-4A, the test stand 202 includes a clamp or vice 224 that holds the coin cell 114 between a first portion or inner portion 226 of the vice 224 and a second portion or outer portion 228 of the vice 224. The first portion 226 includes a hole or aperture or window 230 that allows the magnetic force dilatometry sensor 210 to sense the second side of the coin cell 114 through the aperture 230, and the second portion 228 includes a hole or aperture or window 232 that allows the imaging sensor 214 to view the window 134 at the first side of the coin cell 114 through the aperture 232.

The window 134 at the first side 118 of the case 116 of the coin cell 114 is at least partially transparent to the type of electromagnetic radiation detected by the imaging sensor 214 (FIG. 2). For example, the window 134 may include a polymer film (e.g., KAPTON®), a thin metal foil, a layer of beryllium, or other material sufficiently transparent to X-Rays. Optionally, the window 134 may include a material that is at least partially transparent to visible light, or the window 134 may include a hole or opening in the case 116 in instances where the coin cell 114 does not need to be sealed at the window 134. Although shown as a circular opening in the first portion 118 of the case 116, it should be understood that any suitable shape window may be used, and/or the case 116 may be formed from a sufficiently transparent material.

During a cycling program of the coin cell 114, the magnetic force dilatometry sensor 210 captures the first sensor data 212 and transmits the first sensor data 212 to the control module 204 and the imaging sensor 214 captures the second sensor data 216 and transmits the second sensor data 216 to the control module 204. The first sensor data 212 may be representative of a magnetic force detected at the magnetic force dilatometry sensor 210 as the ferritic spacer 130 (or other magnetic component of the coin cell 114) moves relative to the sensor 210 during cycling of the coin cell 114. Thus, the first sensor data 212 may be calibrated to represent changes in thickness of the coin cell 114, such as to represent a linear distance $D_{114}$ between the magnetic component within the coin cell 114 (e.g., the ferritic spacer 130) and the magnetic force dilatometry sensor 210 during cycling of the coin cell 114. Based on processing the first sensor data 212 (e.g. at the data processing hardware 206), the testing system 200 determines cell expansion bulk or a total expansion value EV for the coin cell 114. The total expansion value EV may be representative of all causes of expansion of the coin cell 114 during cycling.

Based on processing of the second sensor data 214 (e.g., at the data processing hardware 206), the testing system 200 determines changes to the lattice structure 132 of the first electrode 122 during cycling of the coin cell 114. That is, the testing system 200 determines expansion of the lattice structure 132 during cycling of the coin cell 114, which represents a reversible portion of the expansion of the coin cell 114. The testing system 200 may determine a reversible expansion value REV for the coin cell 114. By subtracting the reversible expansion value REV from the total expansion value EV, the testing system 200 may determine an irreversible expansion value IEV for the coin cell 114. The irreversible expansion value IEV may be at least in part representative of a buildup of SEI at the coin cell 114 during cycling. The irreversible expansion value IEV may further represent buildup at the coin cell 114 caused by gas and/or other byproducts. Thus, determination of the irreversible expansion value IEV may be represented by:

$$IEV = EV - REV$$

In other words, monitoring the expansion of the coin cell 114 during cycling using the first sensor data 212 captured by the magnetic force dilatometry sensor 210 may reveal the total expansion of the coin cell 114 due to both electrode expansion and the creation of SEI or other byproducts. Monitoring the coin cell 114 during cycling using the second sensor data 216 captured by the imaging sensor 214 (e.g., via X-Ray diffraction techniques) may reveal electrode lattice expansion. Thus, the expansion of the lattice structure 132 at the coin cell 114 may represent reversible expansion and subtracting the reversible expansion from the total expansion of the coin cell 114 may reveal the irreversible expansion caused by buildup of SEI or other byproducts.

In some examples, with the coin cell 114 held at the test stand 202, the beam 220 of electromagnetic radiation may be directed at the window 134 of the coin cell 114. The electromagnetic radiation may act on the coin cell 114 and changes in the coin cell 114 may be monitored by changes in voltage from the coin cell 114 and based on sensor data 212 captured by the magnetic force dilatometry sensor 210.

Figure 5:
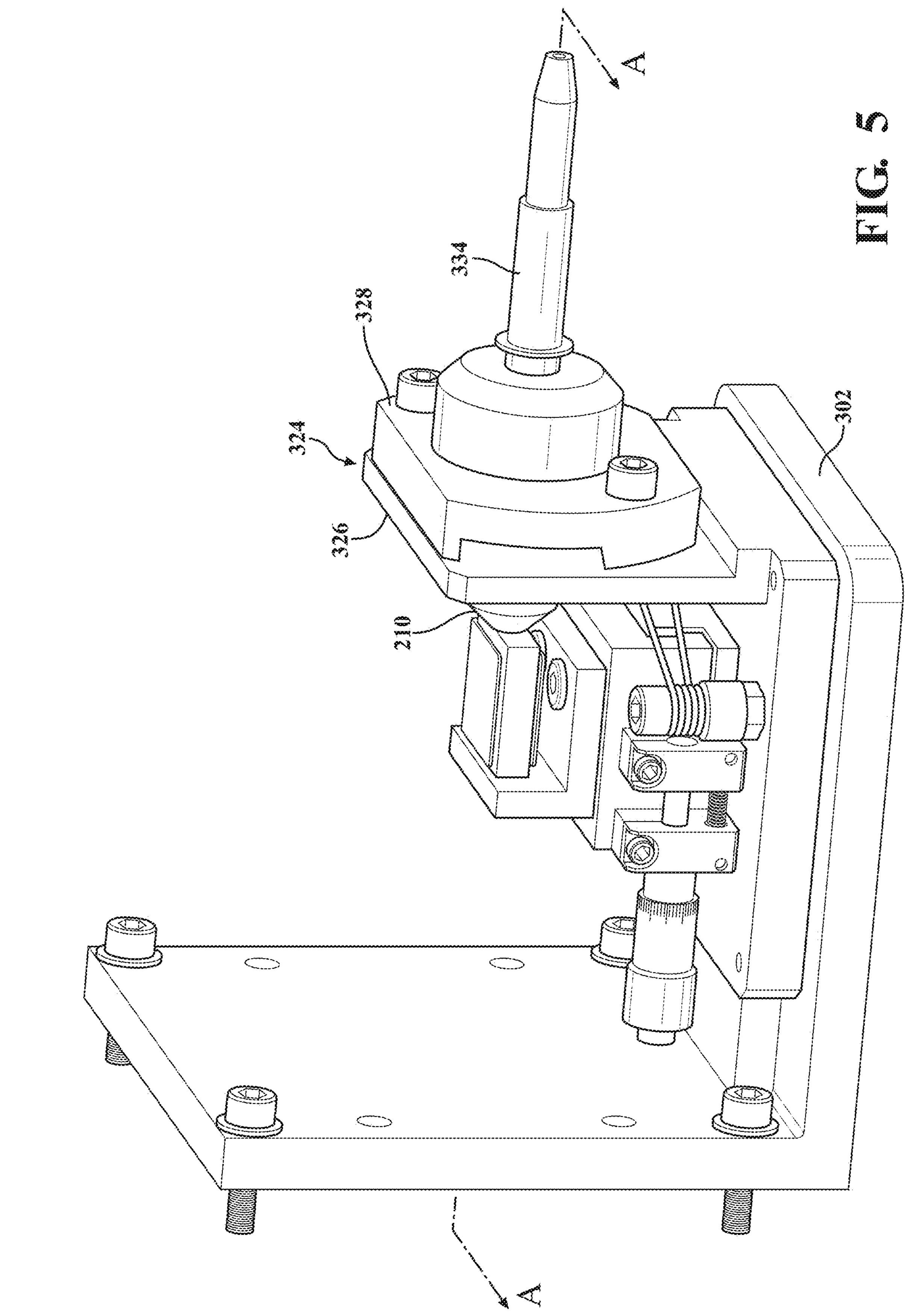
FIG. 5 is a perspective view of another testing system having a force adjustment mechanism for adjusting a load applied to the electrode stack of the coin cell.
Figure 5A:
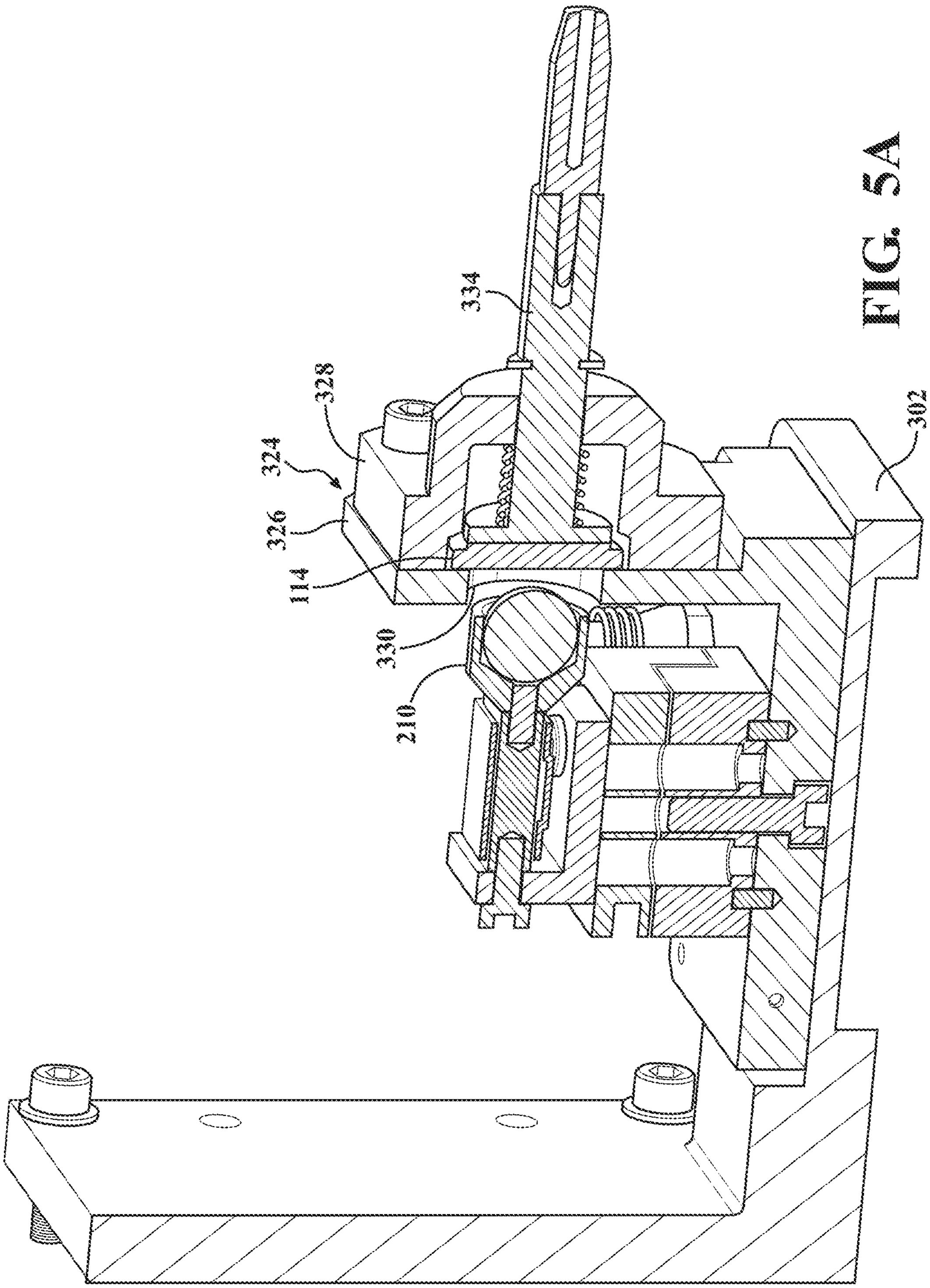
FIG. 5A is a sectional view of the testing system of FIG. 5 taken along the line A-A of FIG. 5.

Optionally, the testing system may be configured to adjust the biasing force applied to the electrode stack within the coin cell 114. For example, and referring to FIGS. 5 and 5A, a test stand 302 is configured to receive or hold the coin cell 114 at a clamp or vice 324 of the test stand 302. The vice 324 holds the coin cell 114 between a first portion or inner portion 326 of the vice 324 and a second portion or outer portion 328 of the vice 324. The first portion 326 includes a hole or aperture or window 330 that allows the magnetic force dilatometry sensor 210 at the test stand 302 to sense the second side of the coin cell 114 through the aperture 330. The second portion 328 of the vice 324 includes a force adjusting mechanism 334 that is configured to apply a force at the first side or portion 118 of the coin cell 114. For example, the force adjusting mechanism 334 may be spring-loaded and configured to adjust the force applied at the coin cell 114. Operating the force adjusting mechanism 334 may adjust the load applied to the electrode stack of the coin cell 114 between the biasing member 128 and the case 116, such as to counteract reductions in force from the magnetic force dilatometry sensor 210 and/or to test the effects of different loads on other characteristics of the coin cell 114. Optionally, the second portion 328 of the clamp 324 may further include a hole or aperture or window so that the imaging sensor 214 may view the first side 118 of the coin cell 114. Thus, the force on the electrode stack of the coin cell 114 may be adjusted and the resulting changes may be monitored by changes in voltage from the coin cell 114, based on sensor data captured by the magnetic force dilatometry sensor 310 and/or based on sensor data captured by the imaging sensor 314 viewing the coin cell 114.

Figure 6:
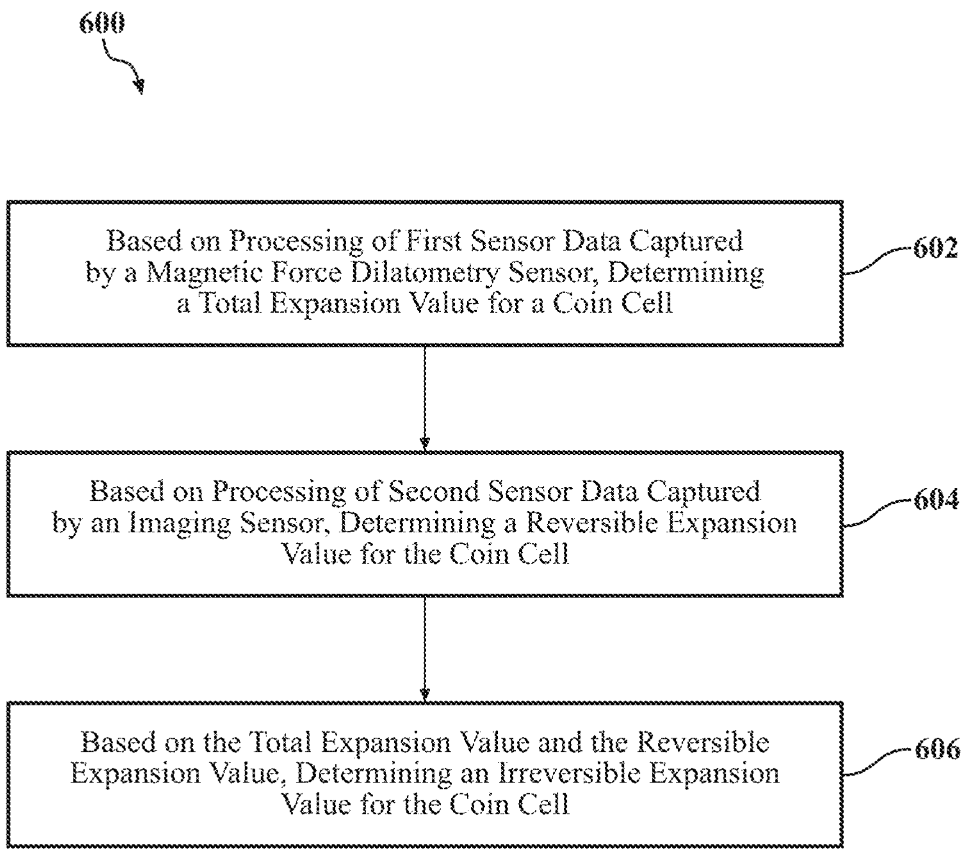
FIG. 6 is a flowchart of an exemplary arrangement of operations for a method of determining the irreversible portion of expansion of the coin cell based on a determined total expansion of the coin cell and a determined reversible portion of expansion of the coin cell.

FIG. 6 provides a flowchart of an exemplary arrangement of operations for a method 600 of determining the irreversible portion of expansion of the coin cell 114 (represented by the irreversible expansion value IEV) based on a determined total expansion of the coin cell 114 (represented by the total expansion value EV) and a determined reversible portion of expansion of the coin cell 114 (represented by the reversible expansion value REV). The method 600 may be executed by the control module 204, such as at the data processing hardware 206 based on operations stored in the memory storage hardware 208. At operation 602, the method 600 includes determining the total expansion value EV for the coin cell 114 based on processing of first sensor data 212 captured by the magnetic force dilatometry sensor 210. The first sensor data 212 is representative of the coin cell 114 during a cycling program of the coin cell 114 while the coin cell 114 is held at the test stand 202. At operation 604, the method 600 includes determining a reversible expansion value REV for the coin cell 114 based on processing of second sensor data 216 captured by the imaging sensor 214. The second sensor data 214 is also representative of the coin cell 114 during the cycling program of the coin cell 114 while the coin cell 114 is held at the test stand 202. At operation 606, the method 600 includes determining the irreversible expansion value IEV for the coin cell 114 based on the total expansion value EV and the reversible expansion value REV. The irreversible expansion value IEV may be at least in part representative of a buildup of SEI at the coin cell 114 and the reversible expansion value REV may be at least in part representative of expansion of the lattice structure 132 of the electrode 122 of the coin cell 114.

Thus, the testing system reveals reactions in battery cells that cannot be resolved with only X-Ray diffraction or dilatometry alone. The bulk and microstructure contributions of cell expansion can be measured independently and compared by incorporating an X-Ray and visible light transparent window into the coin cell having a magnetic spacer, thus allowing for combined in-operando monitoring capabilities.

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A computer-implemented method when executed on data processing hardware causes the data processing hardware to perform operations comprising:

based on processing of first sensor data captured by a magnetic force dilatometry sensor, determining a total expansion value for a coin cell, the first sensor data representative of the coin cell during a cycling program of the coin cell with the coin cell held at a fixture;

based on processing of second sensor data captured by an imaging sensor, determining a reversible expansion value for the coin cell, the second sensor data representative of the coin cell during the cycling program of the coin cell with the coin cell held at the fixture; and based on the total expansion value and the reversible expansion value, determining an irreversible expansion value for the coin cell.

2. The method of claim 1, wherein the irreversible expansion value is at least in part representative of a buildup of solid electrolyte interphase (SEI) at the coin cell.

3. The method of claim 1, wherein the reversible expansion value is at least in part representative of a lattice expansion of an electrode of the coin cell.

4. The method of claim 1, wherein the imaging sensor includes an X-Ray detector configured to sense X-Rays reflected from the coin cell.

5. The method of claim 4, wherein the coin cell includes a window at a side of the coin cell facing the X-Ray detector, the window at least partially transparent to X-Rays.

6. The method of claim 1, wherein the imaging sensor includes an optical microscope configured to view visible light reflected from the coin cell.

7. The method of claim 6, wherein the coin cell includes a window at a side of the coin cell facing the optical microscope, the window at least partially transparent to visible light.

8. The method of claim 1, wherein, with the coin cell held at the fixture, a first side of the coin cell faces the magnetic force dilatometry sensor and a second side of the coin cell opposite the first side faces the imaging sensor.

9. The method of claim 8, wherein a cathode of the coin cell is nearest the second side of the coin cell.

10. The method of claim 1, wherein the coin cell is representative of a rechargeable battery of a vehicle.

11. A system comprising:

a fixture configured to hold a coin cell during a cycling program of the coin cell;

a magnetic force dilatometry sensor disposed at or near the fixture;

an imaging sensor disposed at or near the fixture; and memory hardware storing instructions that, when executed on data processing hardware in communication with the memory hardware, cause the data processing hardware to perform operations comprising:

based on processing of first sensor data captured by the magnetic force dilatometry sensor, determining a total expansion value for the coin cell, the first sensor data representative of the coin cell during the cycling program of the coin cell;

based on processing of second sensor data captured by the imaging sensor, determining a reversible expansion value for the coin cell, the second sensor data representative of the coin cell during the cycling program of the coin cell; and based on the total expansion value and the reversible expansion value, determining an irreversible expansion value for the coin cell.

12. The system of claim 11, wherein the irreversible expansion value is at least in part representative of a buildup of solid electrolyte interphase (SEI) at the coin cell.

13. The system of claim 11, wherein the reversible expansion value is at least in part representative of a lattice expansion of an electrode of the coin cell.

14. The system of claim 11, wherein the imaging sensor includes an X-Ray detector configured to sense X-Rays reflected from the coin cell.

15. The system of claim 14, wherein the coin cell includes a window at a side of the coin cell facing the X-Ray detector, the window at least partially transparent to X-Rays.

16. The system of claim 11, wherein the imaging sensor includes an optical microscope configured to view visible light reflected from the coin cell.

17. The system of claim 16, wherein the coin cell includes a window at a side of the coin cell facing the optical microscope, the window at least partially transparent to visible light.

18. The system of claim 11, wherein, with the coin cell held at the fixture, a first side of the coin cell faces the magnetic force dilatometry sensor and a second side of the coin cell opposite the first side faces the imaging sensor.

19. The system of claim 18, wherein a cathode of the coin cell is nearest the second side of the coin cell.

20. The system of claim 11, wherein the coin cell is representative of a rechargeable battery of a vehicle.

* * * * *